(12) United States Patent
Matsuyama et al.

(10) Patent No.: US 6,294,851 B1
(45) Date of Patent: Sep. 25, 2001

(54) RESIN MOLDING METHOD FOR INSERTING TERMINAL AND CONNECTOR FOR MOTOR HAVING THE TERMINAL (75) Inventors: Youichi Matsuyama, Shinshiro; Kazuaki Tsujita, Toyohashi, both of (JP)

(73) Assignee: Asmo Co., Ltd., Kosai (JP)

( * ) Notice: Subject to any disclaimer, the term of this patent is extended or adjusted under 35 U.S.C. 154(b) by 0 days.

(21) Appl. No.: 09/328,309

(22) Filed: Jun. 8, 1999

(30) Foreign Application Priority Data

Jun. 10, 1998 (JP) .................................................. 10-162009
Nov. 30, 1998 (JP) .................................................. 10-339099

(51) Int. Cl.[7] .............................. H01R 9/00; H02K 5/22
(52) U.S. Cl. ................................ 310/43; 310/71; 310/89; 29/596
(58) Field of Search .................................. 310/42, 43, 89, 310/75 R, 71; 29/596; 264/272.15, 279.2, 279.19

(56) References Cited

U.S. PATENT DOCUMENTS

| | | | |
|---|---|---|---|
| 4,847,528 | * 7/1989 | Eguchi et al. | 310/239 |
| 5,073,735 | * 12/1991 | Takagi | 310/71 |
| 5,334,897 | * 8/1994 | Ineson et al. | 310/89 |
| 5,423,117 | * 6/1995 | Okada et al. | 29/605 |
| 5,636,431 | * 6/1997 | Ade | 29/596 |
| 5,806,169 | * 9/1998 | Trago et al. | 29/596 |

FOREIGN PATENT DOCUMENTS

A-10-164789    6/1998   (JP) .................................. H02K/5/10

* cited by examiner

Primary Examiner—Burton S. Mullins
(74) Attorney, Agent, or Firm—Fish & Richardson P.C.

(57) ABSTRACT

A terminal for supplying power to a motor portion is inserted in a housing formed by molding resin, and both ends of the terminal are exposed from the housing. When the housing is molded, an insulation member such as first and second plates contacts a die for forming the housing, and the terminal is engaged with the insulation member before the housing is molded, so that an attachment position of the terminal is set relative to the die through the insulation member. The insulation member is inserted in the housing together with the terminal by pouring melted resin in the die. Thus, the housing in which the terminal is inserted can be readily molded, and it can prevent liquid from being introduced to the terminal in the housing.

6 Claims, 10 Drawing Sheets

RESIN MOLDING METHOD FOR INSERTING TERMINAL AND CONNECTOR FOR MOTOR HAVING THE TERMINAL

CROSS-REFERENCE TO RELATED APPLICATION

This application is related to and claims priority from Japanese Patent Applications No. Hei. 10-162009 filed on Jun. 10, 1998, and No. Hei. 10-339099 filed on Nov. 30, 1998, the contents of which are hereby incorporated by reference.

BACKGROUND OF THE INVENTION

1. Field of the Invention

The present invention relates to a resin molding method for inserting a terminal in a resinous housing, relates to a connector in which the terminal is inserted in the resinous housing using the resin molding method, and relates to a motor having the connector.

2. Description of Related Art

As a driving source for driving a unit such as a power window device, an actuator having a motor portion and a deceleration portion integrally assembled is used. In the actuator, the deceleration portion is provided in a housing made of a synthetic resin, and a motor case for rotatably supporting a motor is fixed to an attachment portion of the housing. Further, a connector for supplying power from a battery to the motor is formed in the housing, and a terminal is inserted in the housing between the connector and the attachment portion of the motor. The terminal is exposed from the housing so that the motor and the battery are electrically connected.

Figure 14:
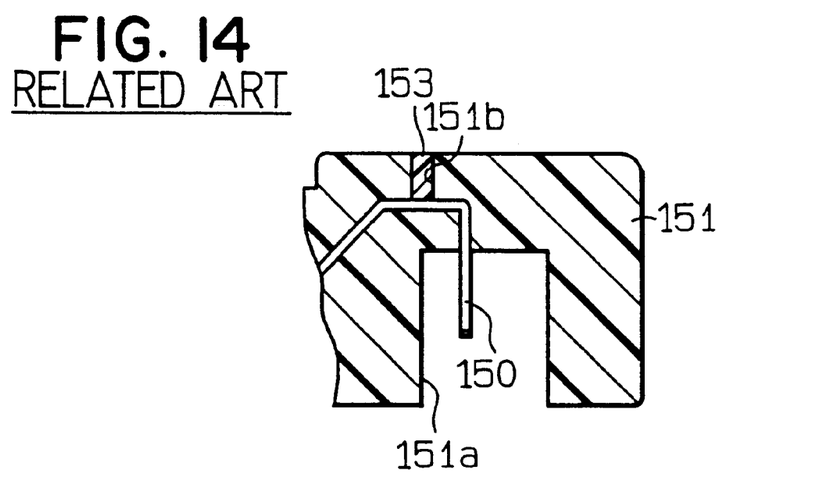
FIG. 14 is a cross-sectional view showing a connector.
Figure 15:
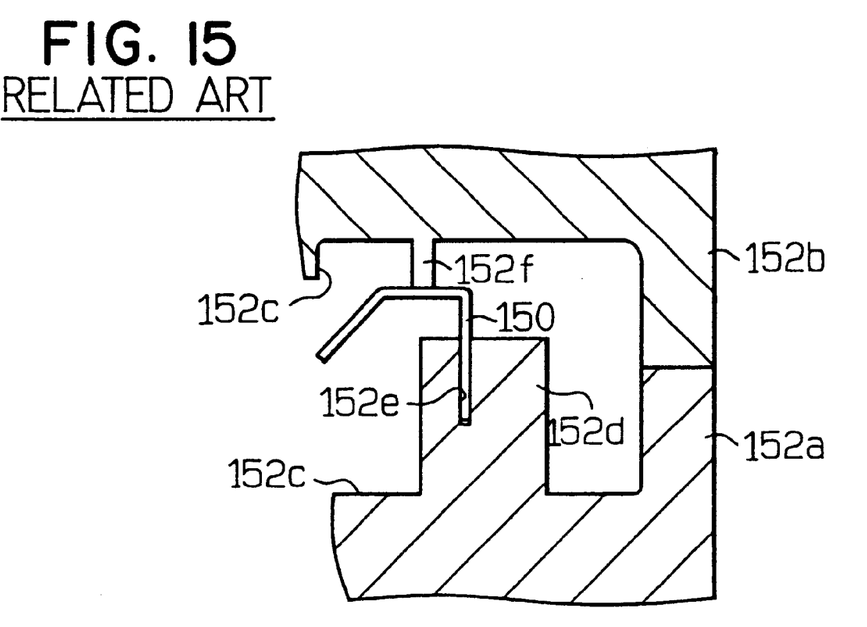
FIG. 15 is a cross-sectional view for explaining a resin molding method of the connector in FIG. 14.

As shown in FIG. 14, a terminal 150 is inserted in a connector 151 of a housing made of resin, an insertion recess portion 151a engaging with a connector of a battery is provided in the connector 151, and the terminal 150 is exposed from the insertion recess portion 151a of the connector 151. The housing having the connector 151 is molded by a pair of first and second dies 152a, 152b as shown in FIG. 15. That is, a molding recess 152c for molding an outer shape of the connector 151 is formed over both of the first and second dies 152a, 152b. Further, a molding protrusion 152d for forming the insertion recess portion 151a is formed in the first die 152a, and an insertion hole 152e for inserting the terminal 150 therein is formed in the molding protrusion 152d so that the terminal 150 is exposed after molding. On the other hand, the second die 152b has a supporting protrusion 152f which extends to contact the terminal 150 when the terminal 150 is inserted into the insertion hole 152e. The supporting protrusion 152f prevents the terminal 150 from being removed from the insertion hole 152e when melted resin is poured into the first and second dies 152a, 152b, and sets an attachment position of the terminal 150. Due to the supporting protrusion 152f of the second die 152b, a hole 151b is formed in the connector 151 as shown in FIG. 14. When the actuator is used as the driving source for driving the power window device, water may be attached onto the outer surface of the actuator. Therefore, after forming the connector 151, a liquid seal material or a malted resin material 153 is filled in the hole 151b, for preventing water from being introduced to the terminal 150 from the hole 151b.

However, in this case, a filling step for filling the resin material 153 in the hole 151b is necessary. Further, when the resin material 153 filled in the hole 151b solidifies, the resin material 153 is contracted. Therefore, the volume of the resin material 153 becomes smaller, and a clearance is formed between the inner peripheral surface of the hole 151b and the resin material 153. Thus, sealing performance of the hole 151b is insufficient, and water may be introduced to the terminal 150 from the hole 151b.

SUMMARY OF THE INVENTION

In view of the foregoing problems, it is an object of the present invention to provide a resin molding method for inserting a terminal in a resinous member, which sufficiently prevents liquid from being introduced to the terminal in the resinous member while having a simple molding step.

It is an another object of the present invention to provide a connector having a terminal inserted in a resinous housing using the resin molding method, and a motor having the connector.

According to a resin molding method of a resinous member of the present invention, an insulation member is engaged with a terminal, the insulation member contacts a die for molding the resinous member so that an attachment position of the terminal relative to the die is set through the insulation member, and thereafter, a melted resin is poured into the die having the terminal and the insulation member therein to form the resinous member in which the insulation member is inserted together with the terminal. Because the insulation member contacts the die, the terminal is not exposed from a resinous member in a contacting position between the insulation member and the die. Therefore, it can prevent liquid from being introduced to the terminal in the resinous housing from the contacting portion, and the resinous member having the terminal is molded with a simple method.

Preferably, the insulation member has a melting point equal to or lower than that of the resin for molding the resinous member. Therefore, at least a portion of the insulation member contacting the resin is melted by heat from the melted resin, and the insulation member is bonded to the resinous member. Thus, a clearance between the insulation member and the resinous member can be sufficiently closed, and it can accurately prevent liquid from being introduced to the terminal in the resinous member.

According to the present invention, a connector for a motor includes a housing formed by molding resin from a die, a terminal disposed in the housing in such a manner that both ends of the terminal are exposed from the housing, and an insulation member having a first portion contacting the die and a second portion contacting the terminal. The insulation member contacts the die at the first position so that the terminal is disposed at a predetermined position in the die for forming the housing, and the insulation member is inserted in the housing together with the terminal by pouring melted resin into the die. Because the insulation member contacts the die, the terminal is not exposed from the housing in a contacting portion between the insulation member and the die. Therefore, it can prevent liquid from being introduced to the terminal in the resinous housing from the contacting portion, and the resinous member is molded with a simple structure.

Preferably, the insulation member has a groove around a contacting portion contacting the die. When the melted resin forming the housing is solidified, resin filled in the groove is contracted, and the resin filled in the groove is air-tightly bonded to an inner surface of the groove. Therefore, seal performance between the insulation member and the housing can be improved.

More preferably, the insulation member has a melting point equal to or lower than that of the resin for molding the housing. Further, the insulation member has a thin wall portion having a thinness thinner than the other portion, and the thin wall portion is melted by the melted resin pouring into the die. Thus, a clearance between the housing and the insulation member can be further accurately closed. As a result, even when liquid is introduced from a contacting portion between the die of the housing and the insulation member, it can prevent liquid from being introduced to the terminal in the housing.

Still more preferably, the second portion of the insulation member is engaged with the terminal at a predetermined position. Further, the first portion of the insulation member is an engagement portion engaging with the die at a predetermined position. Therefore, the terminal can be inserted in the housing at a predetermined position.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

Figure 1:
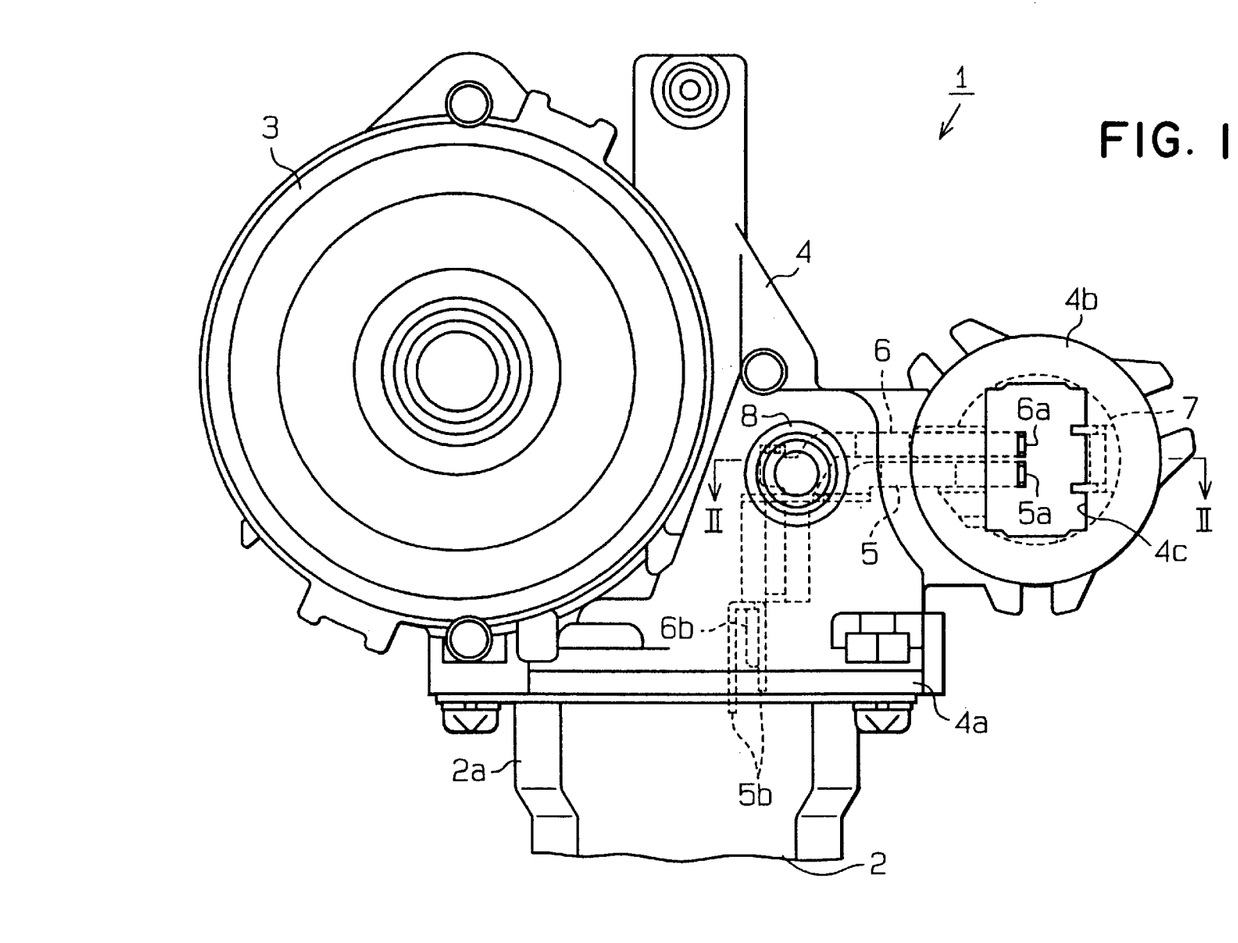
FIG. 1 is a plan view showing an actuator according to a preferred embodiment of the present invention.

A preferred embodiment of the present invention will be described hereinafter with reference to FIGS. 1–7. In the embodiment, the present invention is typically applied to an actuator 1 used as a driving source of a power window device of a vehicle. As shown in FIG. 1, the actuator 1 includes a motor portion 2 and a deceleration portion 3 assembled integrally.

The deceleration portion 3 includes a deceleration structure (not shown) disposed in a housing 4 made of resin. The housing 4 is formed from a resin molding method. An attachment portion 4a for attaching a case 2a of the motor portion 2 and a connector 4b for supplying power from a battery to the motor portion 2 are formed in the housing 4. An engagement recess portion 4c engaging with a battery side connector (not shown) is formed in the connector 4b.

Figure 2:
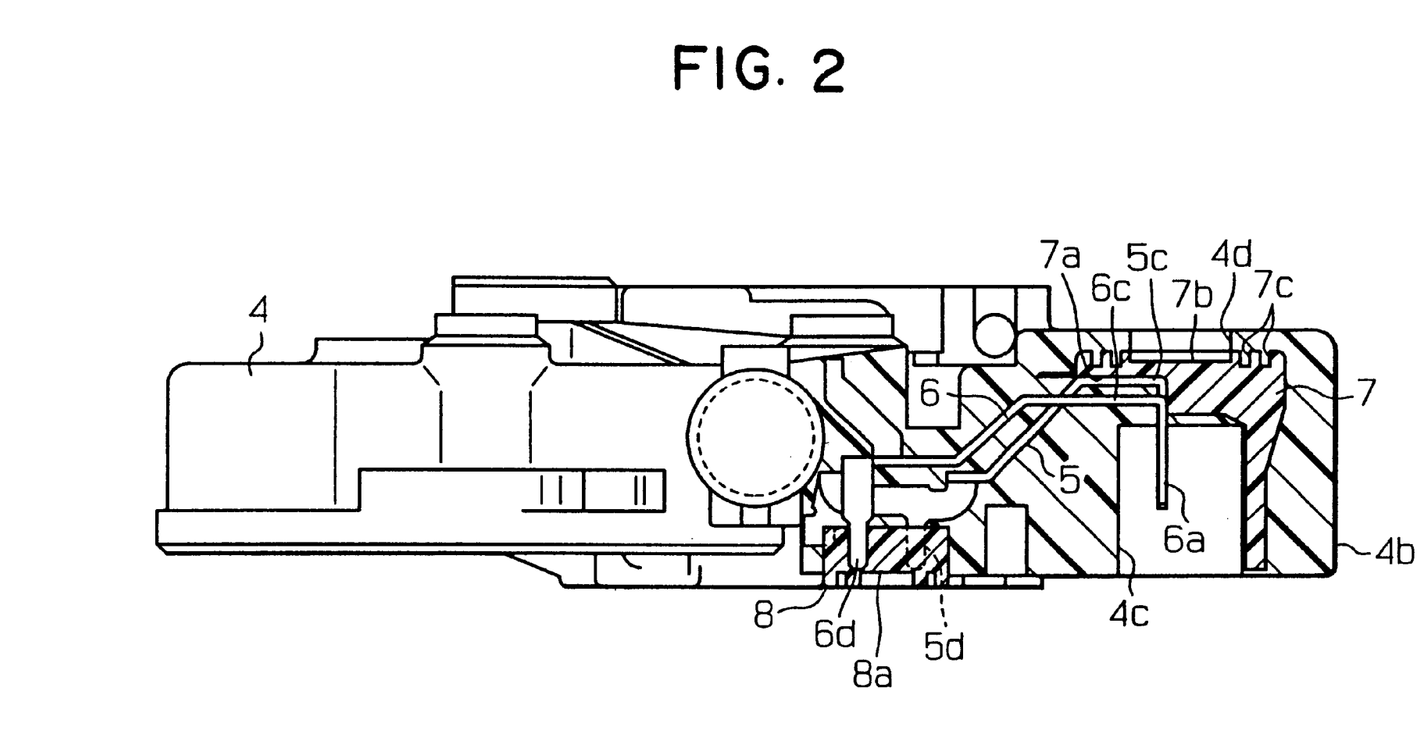
FIG. 2 is a cross-sectional view taken along line II—II in FIG. 1.

As shown in FIGS. 1, 2, first and second terminals 5, 6 are inserted in the housing 4 between the connector 4b and the attachment portion 4a of the motor portion 2. Exposed portions 5a, 6a at one end side of the first and second terminals 5, 6 are exposed from the engagement recess portion 4c, and exposed portions 5b, 6b at the other end side of thereof are exposed from the attachment portion 4a.

Figure 3:
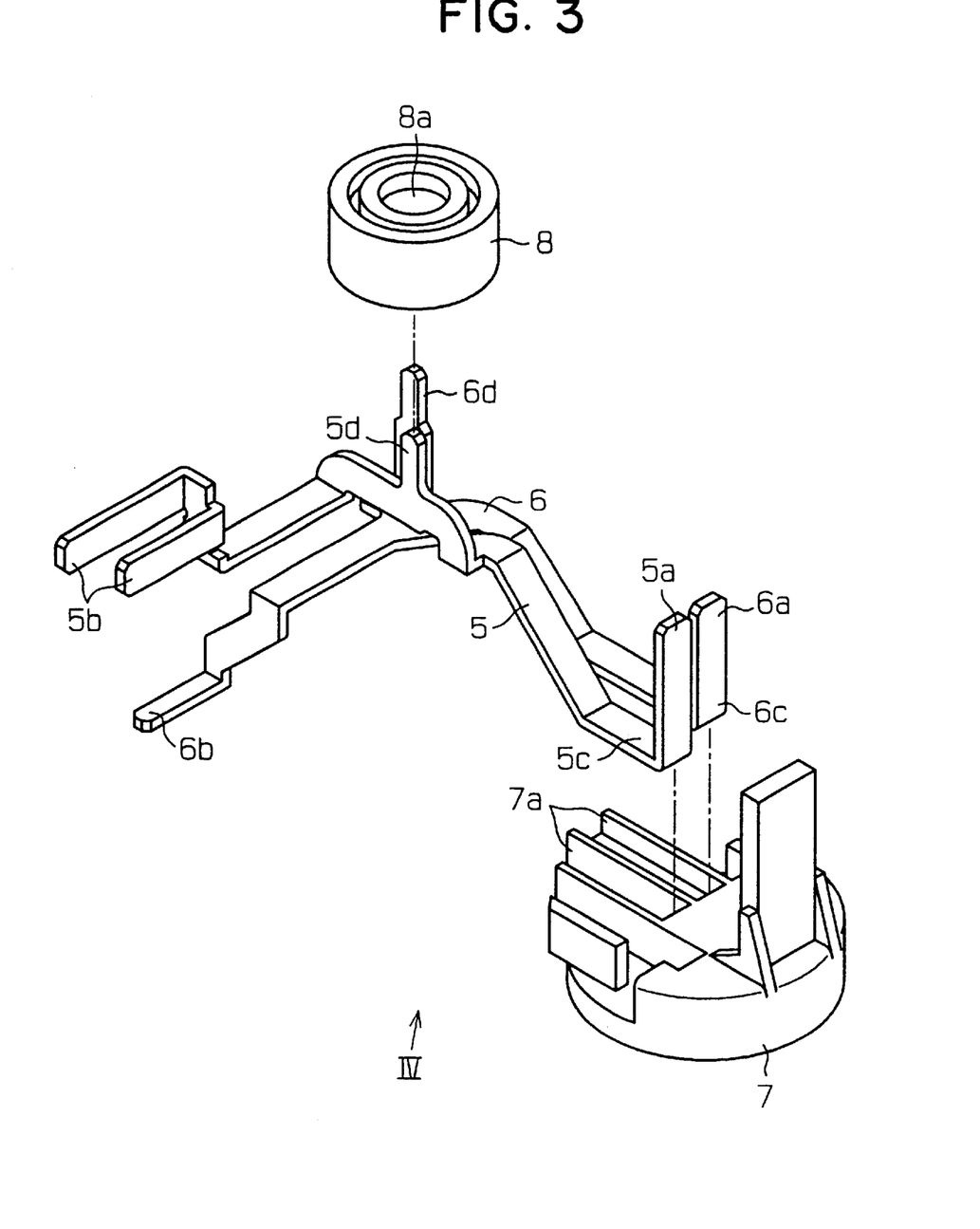
FIG. 3 is a perspective view showing first and second terminals and first and second plates of the embodiment.
Figure 4:
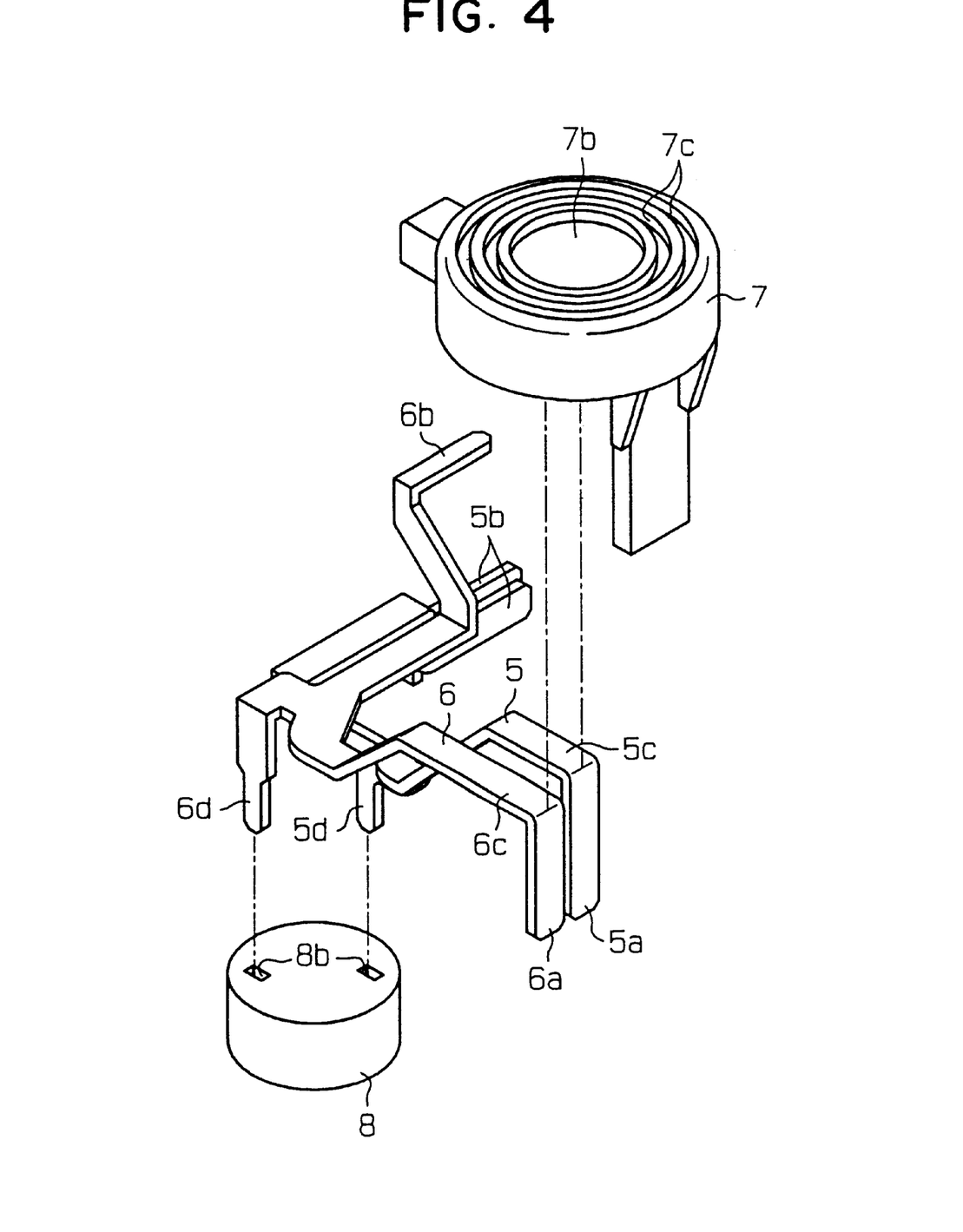
FIG. 4 is a perspective view taken from arrow IV in FIG. 3.

As shown in FIGS. 3, 4, each of the first and second terminals 5, 6 is a plate like formed into an approximate L-shape. The first and second terminals 5, 6 have the exposed portions 5a, 5b, 6a, 6b at both ends thereof, respectively. The exposed portions 5a, 6a of the first and second terminals 5, 6 on the side of the connector 4b are bent upwardly, so that bent portions 5c, 6c are formed in the first and second terminals 5, 6, respectively. Further, an intermediate protrusion 5d extending upwardly is formed at an intermediate portion of the first terminal 5, and an intermediate protrusion 6d extending upwardly is formed at an intermediate portion of the second terminal 6, as shown in FIG. 3. In the embodiment, as shown in FIG. 2, a first plate 7 made of an insulation material such as synthetic resin is disposed at a position adjacent to the connector 4b, so that attachment positions of the terminals 5, 6 are set when the housing 4 is formed. Similarly, a second plate 8 made of an insulation material such as synthetic resin is disposed at a position adjacent to the attachment portion 4a.

As shown in FIGS. 3, 4, each of the first and second plates 7, 8 is formed into an approximate disk like. Insertion grooves 7a into which the bend portions 5c, 6c of the terminals 5, 6 are inserted are formed in the first plate 7 so that it can prevent attachment positions of the terminals 5, 6 from being shifted. That is, the bent portions 5c, 6c of the first and second terminals 5, 6 are inserted into the insertion grooves 7a so that the terminals 5, 6 are engaged with the first plate 7. On the other had, as shown in FIG. 4, on the back side surface of the first plate 7 having the insertion groove 7a, an insertion hole 7b engaging with a supporting protrusion log of a second die 10b (see FIGS. 5, 6) is formed. Around the insertion hole 7b on the back side surface of the first plate 7, two circular grooves 7c having different diameters are formed.

On the other hand, as shown in FIG. 3, an insertion hole 8a into which a supporting protrusion 10f of a first die 10a (see FIGS. 5, 6) is inserted is formed in the second plate 8 so that the second plate 8 can be engaged with the first die 10a. Further, on a surface of the second plate 8, at a back side of the insertion hole 8a, insertion holes 8b are formed so that the intermediate protrusions 5d, 6d of the first and second terminals 5, 6 can be inserted into the insertion holes 8b. Therefore, it can prevent the attachment positions of the first and second terminals 5, 6 from being shifted.

Figure 5:
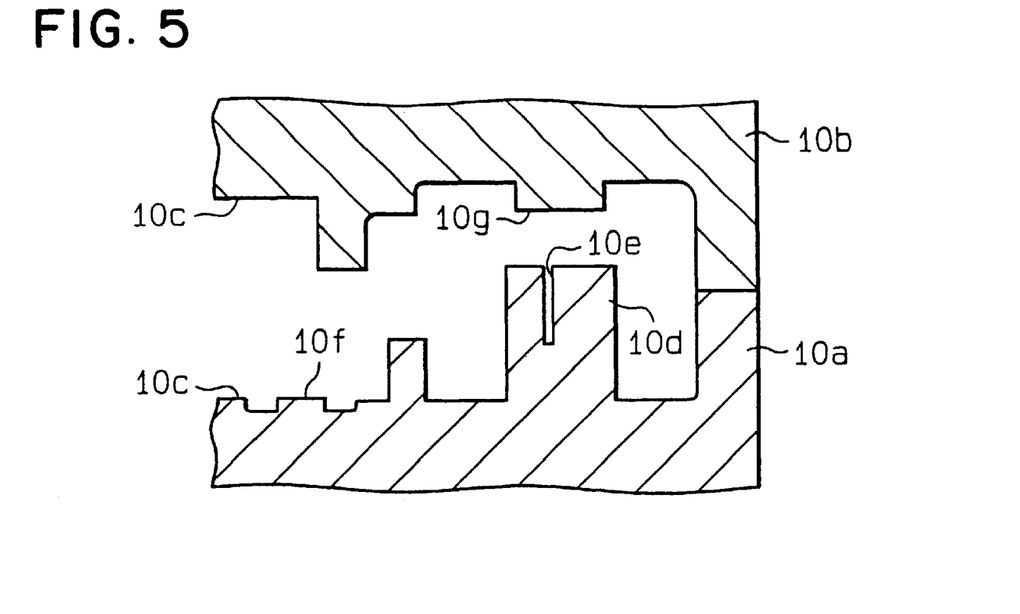
FIG. 5 is a cross-sectional view showing first and second dies for molding a part of a housing.
Figure 6:
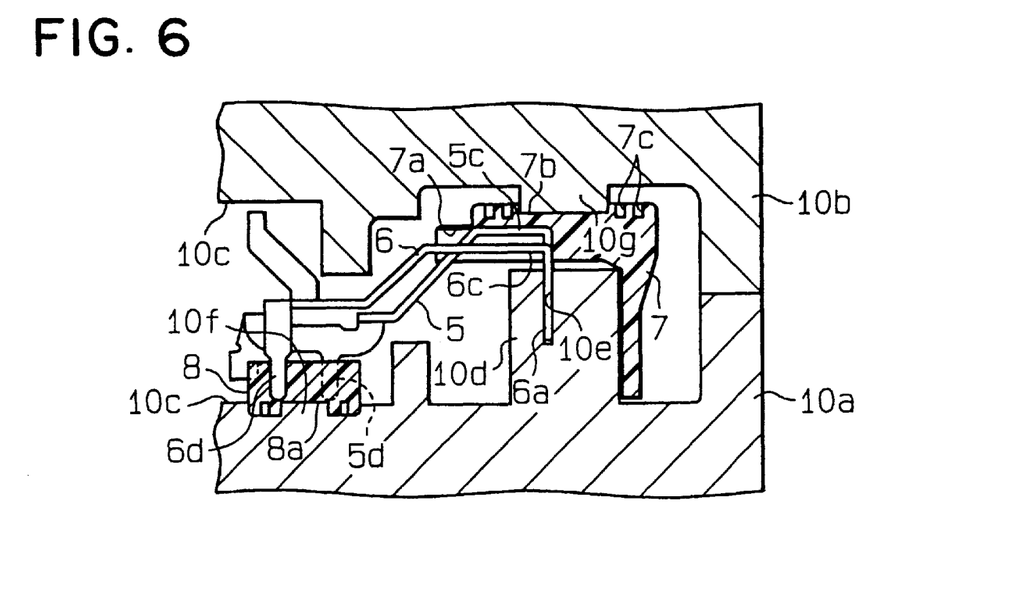
FIG. 6 is a cross-sectional view for explaining a resin molding method of the housing.

The housing 4 is molded from resin (i.e., molding resin) by the first and second dies 10a, 10b joined together. That is, as shown in FIGS. 5, 6, a molding recess portion 10c for molding an outer shape of the connector 4b is formed over both of the first and second dies 10a, 10b. A molding protrusion 10d for forming the engagement recess portion 4c is formed in the first die 10a. Insertion holes 10e (only indicating a single hole in FIG. 5) for inserting the exposed portions 5a, 5b of the first and second terminals 5, 6 therein is formed in the molding protrusion 10d of the first die 10a. The supporting protrusion 10f formed in the first die 10a is inserted into the insertion hole 8a of the second plate 8 to prevent the attachment position of the second plate 8 from being shifted. On the other hand, the supporting protrusion 10g formed in the second die 10b is inserted into the insertion hole 7b of the first plate 7 to prevent the attachment position of the first plate from being shifted. The first and second plates 7, 8 are supported by the supporting protrusion 10g of the second die 10b and the supporting protrusion 10f of the first die 10a. Therefore, when melted synthetic resin flows (i.e., pours) into the molding recess 10c of the first and second dies 10a, 10b, the supporting protrusions 10g, 10f of the first and second dies 10a, 10b prevent the first and second terminals 5, 6 from being removed from the insertion holes 10e while setting the attachment positions of the first and second terminals 5, 6.

When the housing 4 is molded from resin, firstly, the bent portions 5c, 6c of the first and second terminals 5, 6 are respectively inserted into the insertion grooves 7a of the first plate 7, and the intermediate protrusions 5d, 6d thereof are inserted into the insertion holes 8b of the second plate 8. Next, the exposed portions 5a, 6a of the first and second terminals 5, 6 are inserted into the insertion holes 10e of the first die 10a, and the second plate 8 is supported by the supporting protrusion 10f of the first die 10a. In this state, the second die 10b is engaged to the first die 10a as shown in FIG. 6, and the supporting protrusion 10g of the second die 10b is inserted into the insertion hole 7b of the first plate 7. That is, the first and second terminals 5, 6 are disposed respectively at predetermined positions of the first and second dies 10a, 10b by the first and second plates 7, 8 and the supporting protrusions 10f, 10g.

Thereafter, melted resin is poured into the molding recess 10c formed over the first and second dies 10a, 10b. When the resin flowing into the first and second dies 10a, 10b is solidified, the first and second dies 10a, 10b are separated so that the housing 4 having the first and second terminals 5, 6 and the first and second plates 7, 8 is molded. That is, the first and second terminals 5, 6 are inserted in the housing 4 at the predetermined positions together with the first and second plates 7, 8. In the embodiment, the first plate 7 is inserted in the housing 4 approximately except for the insertion hole 7b of the first plate 7, and the second plate 8 is inserted in the housing 4 approximately except for a surface where the insertion hole 8a of the second plate 8 is formed.

The housing 4 formed by the above-described method has the hole 4d due to the supporting protrusion 10g of the second die 10b. However, as shown in FIG. 2, because the first and second terminals 5, 6 are not exposed to the outside in the hole 4d, it can prevent liquid such as water from being introduced into the terminals 5, 6 from the hole 4d.

Figure 7:
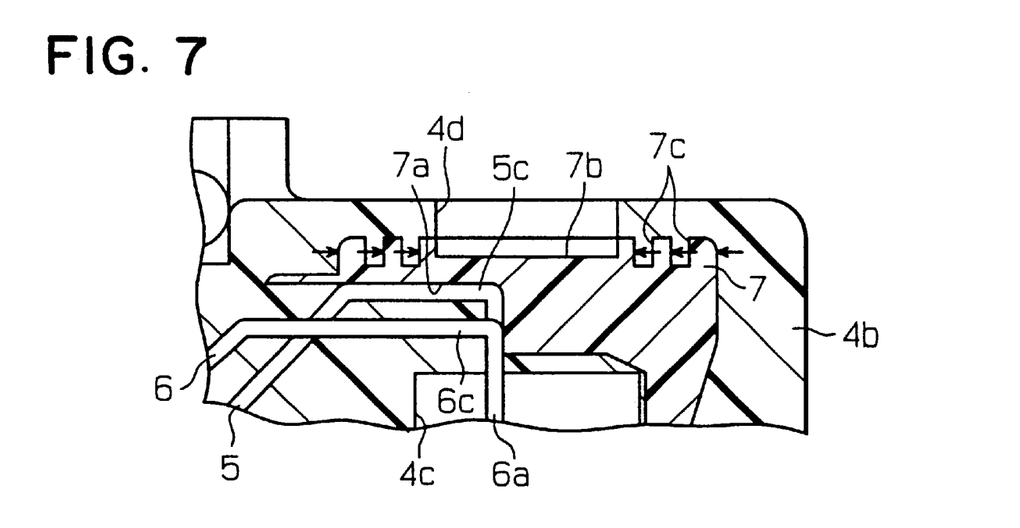
FIG. 7 is an enlarged sectional view showing a main portion of the housing.

The synthetic resin is generally contracted when being solidified. Therefore, as shown in FIG. 7, the resin for molding the housing 4 is solidified while contracting force toward a center of the first plate 7 is applied to an outer peripheral surface of the first plate 7 and an inner wall surface of the circular grooves 7c. As shown in FIG. 7, due to the contracting force shown by arrows in FIG. 7, the outer peripheral surface of the first plate 7 and the inner wall surface of the circular grooves 7c is air-tightly bonded to the housing 4. Thus, it can prevent liquid such as water from being introduced to the terminals 5, 6 from the hole 4d.

According to the embodiment of the present invention, the attachment positions of the first and second terminals 5, 6 are set in the first and second dies 10a, 10b. through the first and second plates 7, 8, and the first and second plates 7, 8 are inserted in the housing 4 together with the first and second terminals 5, 6. Further, when the housing is molded, the first and second plates 7, 8 contact the first and second dies 10a, 10b. Thus, the first and second terminals 5, 6 are not exposed in a contact portion between the first and second plates 7, 8 and the first and second dies 10a, 10b. As a result, it can sufficiently prevent liquid from being introduced to the first and second terminals 5, 6, thereby preventing a trouble such as electrical leak. Further, because it is not necessary to perform a water-proof step, the housing 4 is readily molded.

According to the embodiment of the present invention, the circular grooves 7c are formed in the first plate 7 around the insertion hole 7b where the first plate 7 contacts the second die 10b. Because synthetic resin is contracted during solidifying, contracting force toward a center of the first plate 7 is applied to the inner wall surface of the circular grooves 7c and the outer peripheral surface of the first plate 7. Therefore, after the synthetic resin solidifies, the outer peripheral surface of the first plate 7 and the inner wall surface of the circular grooves 7c of the first plate 7 tightly contacts the housing 4. Thus, even when the hole 4d is formed in the housing 4 due to the supporting protrusion 10g of the second die 10g, the first and second terminals 5, 6 are not exposed from the hole 4d, and it can prevent liquid from being introduced to the first and second terminals 5, 6 from the hole 4d.

Further, because each of the circular grooves 7c has a circular shape, uniform contracting force is applied to the inner wall surface of the circular grooves 7c, and resin filled in the circular grooves 7c uniformly contacts the inner wall surface of the circular grooves 7c. As a result, it can further prevent liquid from being introduced into the first and second terminals 5, 6.

According to the embodiment of the present invention, the first plate 7 has the insertion grooves 7a into which the bent portions 5c, 6c of the first and second terminals 5, 6 are inserted. Further, insertion hole 7b into which the supporting protrusion 10g of the second die 10b is inserted is formed in the first plate 7 on the back side relative to the insertion groove 7a. On the other hand, the insertion hole 8a into which the supporting protrusion 10f of the first die 10a is inserted is formed at the center of the second plate 8, and the insertion holes 8b into which the intermediate protrusions 5d, 6d of the first and second terminals 5, 6 are respectively inserted are formed in the second plate 8 on the back side of the insertion hole 8a. Thus, each of the first and second terminals 5, 6 can be accurately attached to predetermined positions of the first and second plates 7, 8. As a result, it prevents an attachment position disagreement between each of the first and second terminals 5, 6 and each of the first and second plates 7, 8, and an attachment position disagreement between each of the first and second plates 7, 8 and the first and second dies 10a, 10b. Accordingly, the first and second terminals 5, 6 can be inserted in the housing 4 at the predetermined positions through the first and second plates 7, 8.

Although the present invention has been fully described in connection with the preferred embodiment thereof with reference to the accompanying drawings, it is to be noted that various changes and modifications will become apparent to those skilled in the art.

Figure 8:
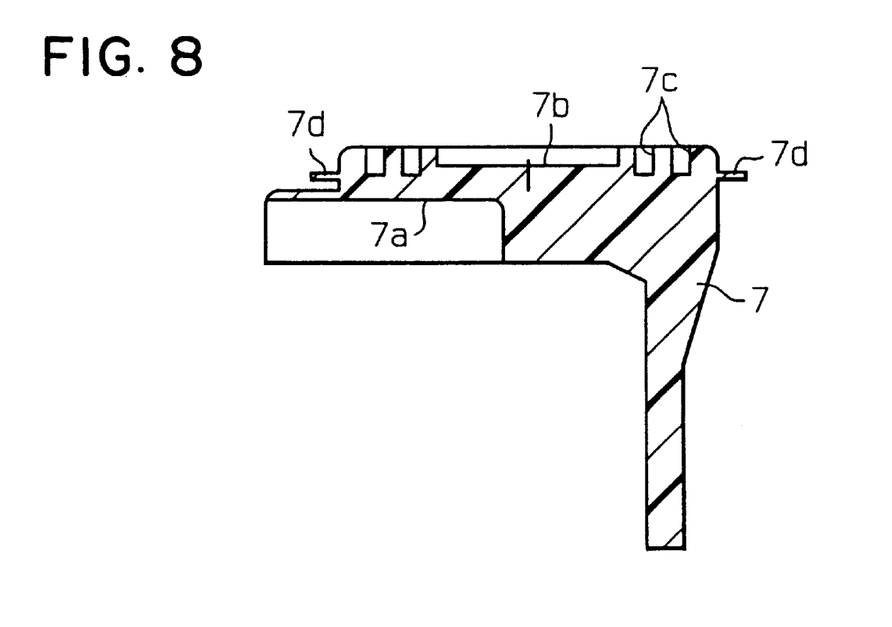
FIG. 8 is a cross-sectional view showing a first plate according to a modification of the embodiment of the present invention.

For example, as shown in FIG. 8, a thin wall portion 7d may be formed on the outer peripheral surface of the first plate 7 into a flange like. When the thin wall portion 7d is formed on the outer peripheral portion of the first plate 7, the thin wall portion 7d is melted by heat from the melted molding resin poured into the first and second dies 10b, 10b for forming the housing 4, and the thin wall portion 7d is fused together with the molding resin. Therefore, a clearance between the first plate 7 and the housing 4 can be sufficiently closed. Thus, it can further sufficiently prevent liquid from being introduced to the first and second terminals 5, 6 from the hole 4d of the housing 4. Further, the thin wall portion 7d may be provided in the circular grooves 7c to parallel to a depth direction of the circular grooves 7c. In this case, the same effect as FIG. 8 can be obtained. The second plate 8 may be formed similarly to the first plate 7.

In the above-described embodiment of the present invention, each of the grooves 7c is formed into a circular shape; however, may be formed into the other shape such as an elliptical shape. Further, in the above-described embodiment of the present invention, two circular grooves 7c having different diameters are formed. However, a single circular groove 7c, or circular grooves 7c more than two may be formed in the first plate 7. Further, any the circular groove 7c may be not provided in the first plate 7.

In the above-described embodiment of the present invention, the second plate 8 is inserted in the housing 4 approximately except for the surface where the insertion hole 8a of the second plate 8 is formed. However, similarly to the first plate 7, the second plate 8 may be inserted in the housing 4 approximately except for the insertion hole 8a of the second plate 8. In this case, because a circular groove is formed in the second plate 8 around the insertion hole 8a, as shown in FIG. 3, the same effect as the first plate 7 can be obtained.

In the above-described embodiment of the present invention, to prevent the attachment position disagreement between the first and second terminals 5, 6 and the first plate 7, the insertion grooves 7a into which the bent portions 5c, 6c of the first and second terminals 5, 6 are inserted are formed in the first plate 7. However, the other structure for preventing the attachment position disagreement between the first and second terminals 5, 6 and the first plate 7 may be used. Further, in the above-described embodiment of the present invention, to prevent the attachment position disagreement between the first plate 7 and the second die 10b, the insertion hole 7b is formed so that the supporting protrusion 10g of the second die 10b is inserted into the insertion hole 7b of the first plate 7. However, the other structure for preventing the attachment position disagreement between the first plate 7 and the second die 10b may be used.

In the above-described embodiment of the present invention, to prevent the attachment position disagreement between the first and second terminals 5, 6 and the second plate 8, the insertion holes 8b are formed in the second plate 8 so that the intermediate protrusions 5d, 6d of the first and second terminals 5, 6 are inserted into the insertion holes 8b. However, the other structure for preventing the attachment position disagreement between the first and second terminals 5, 6 and the second plate 8 may be used. Further, in the above-described embodiment of the present invention, to prevent the attachment position disagreement between the second plate 8 and the first die 10a, the insertion hole 8a is formed in the second plate 8 so that the supporting protrusion 10f of the first die 10a is inserted into the insertion hole 8a of the second plate 8. However, the other structure for preventing the attachment position disagreement between the second plate 8 and the first die 10a may be used.

In the above-described embodiment of the present invention, each of the first and second plates 7, 8 is formed from an insulation member made of synthetic resin. However, each of the first and second plates 7, 8 may be formed from an insulation member made of the other material.

Figure 9:
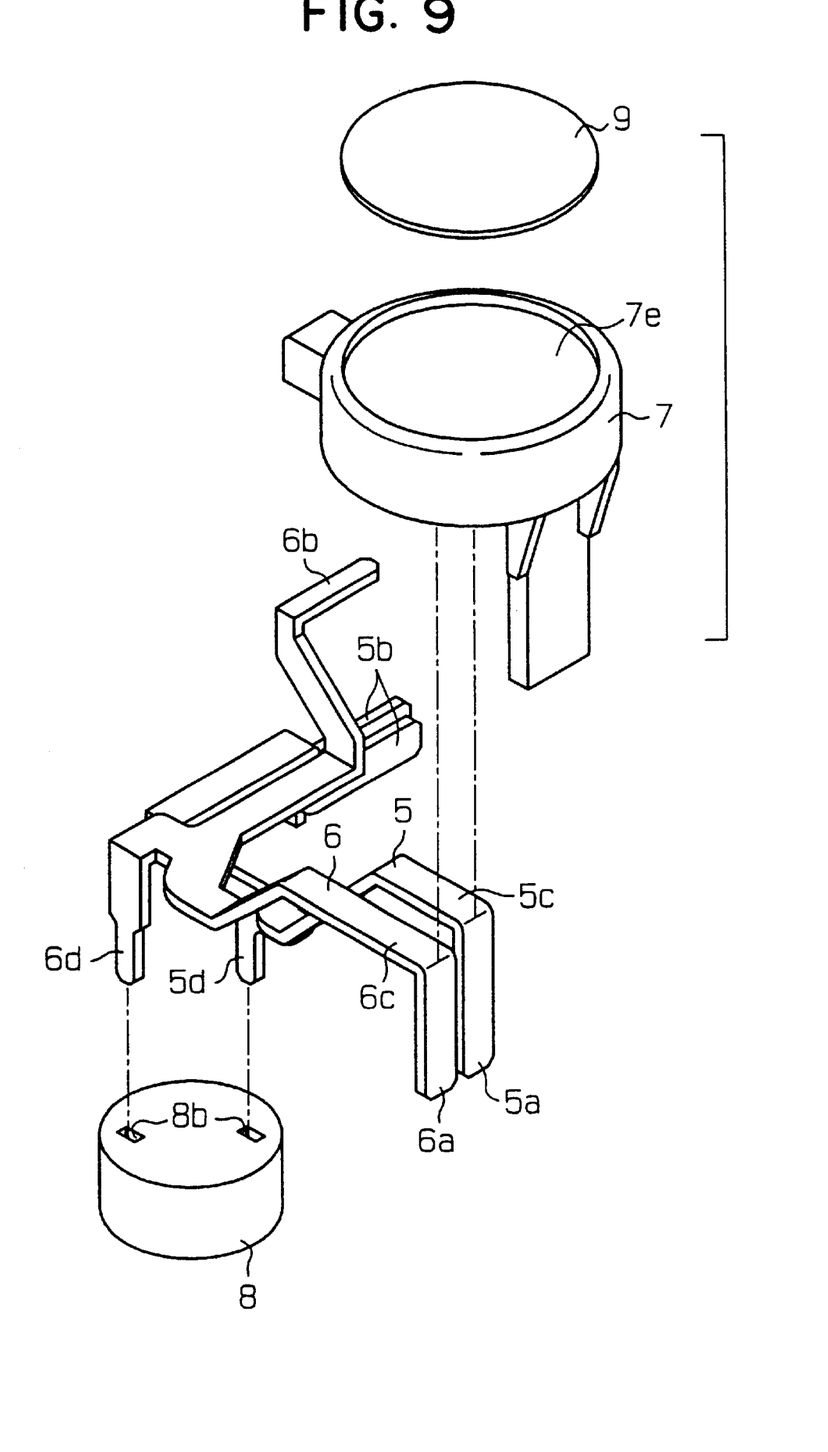
FIG. 9 is a perspective view showing first and second terminals and first and second plates according to an another modification of the embodiment of the present invention.
Figure 10:
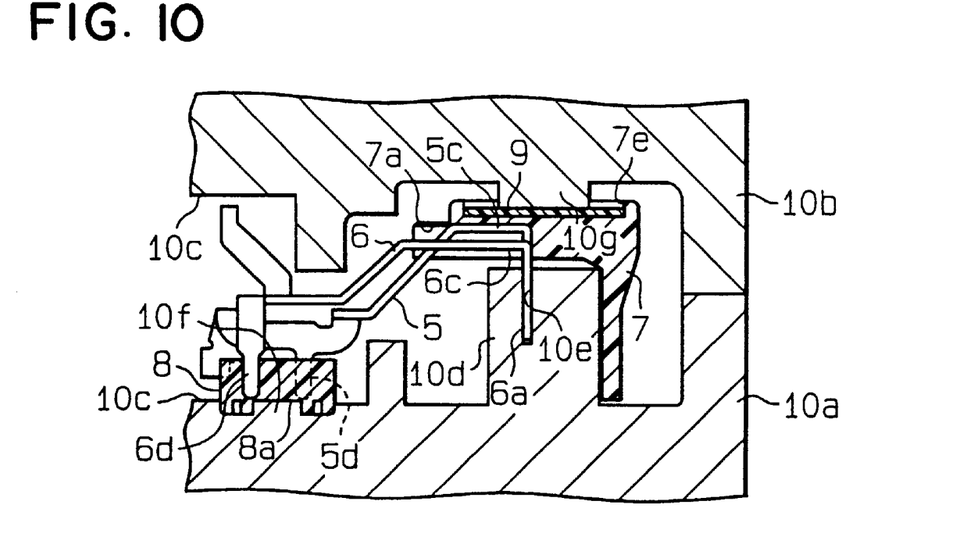
FIG. 10 is a cross-sectional view for explaining a resin molding method of a housing according to the another modification.
Figure 11:
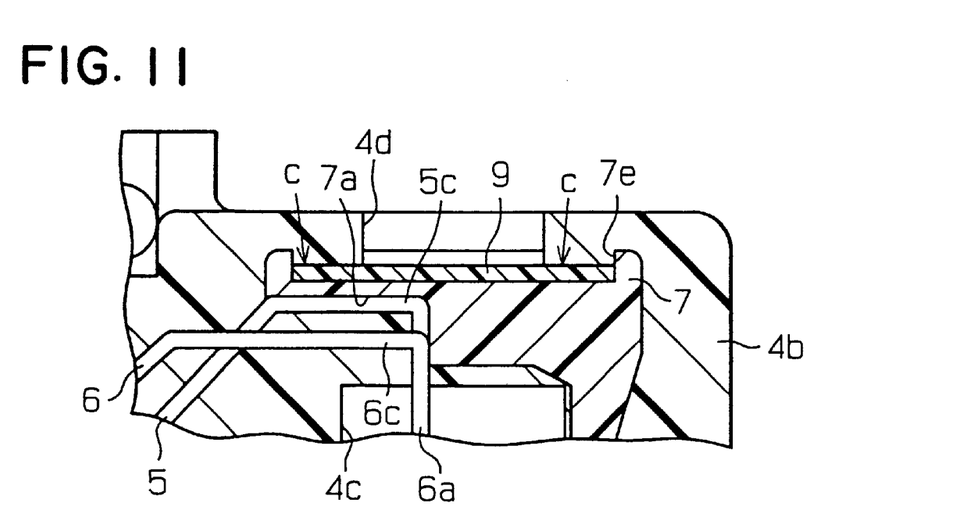
FIG. 11 is an enlarged sectional view showing a main portion of the housing according to the another modification.

Further, the housing 4 may be molded as a resin molding method shown in FIGS. 9–11. That is, as shown in FIGS. 9, 10, a recess portion 7e having an inner diameter larger than an outer diameter of the supporting protrusion 10g of the second die 10b is formed in the first plate 7. A resinous sheet 9 having a shape similar to a shape of a bottom surface of the recess portion 7e is disposed in on the bottom surface of the recess portion 7e of the first plate 7. The sheet 9 is made of resin material having a melting point equal to or lower than the melting point of the molding resin for the housing 4. Thus, as shown in FIG. 11, at least at a boundary portion C between the sheet 9 and the housing 4, the sheet 9 is melted by heat from the melted molding resin for the housing 4, and the sheet 9 and the housing 4 are bonded. Therefore, a clearance between the housing 4 and the sheet 9 is sufficiently closed due to melted sheet 9. Thus, it can prevent liquid from being introduced to the first and second terminals 5, 6 from the hole 4d formed due to the supporting protrusion 10g of the second die 10b. Here, as shown in FIGS. 10, 11, the sheet 9 has the shape approximate similar to that of the bottom surface of the recess portion 7e of the first plate 7. However, the diameter of the sheet 9 may be slightly larger than that of the bottom surface of the recess portion 7e of the first plate 7, and the sheet 9 may be press-fitted into the recess portion 7e of the first plate 7. Further, an adhesive member such as a seal may be provided on one side surface of the sheet 9, and the sheet 9 may be bonded on the bottom surface of the recess portion 7e. In this case, an adhesive may be applied between the sheet 9 and the bottom surface of the recess portion 7e. Thus, the sheet 9 can be accurately fixed to the bottom surface of the recess portion 7e, and it can prevent the sheet 9 from being moved from the recess portion 7e due to flow pressure of melted molding resin when the housing 4 is molded.

Figure 12:
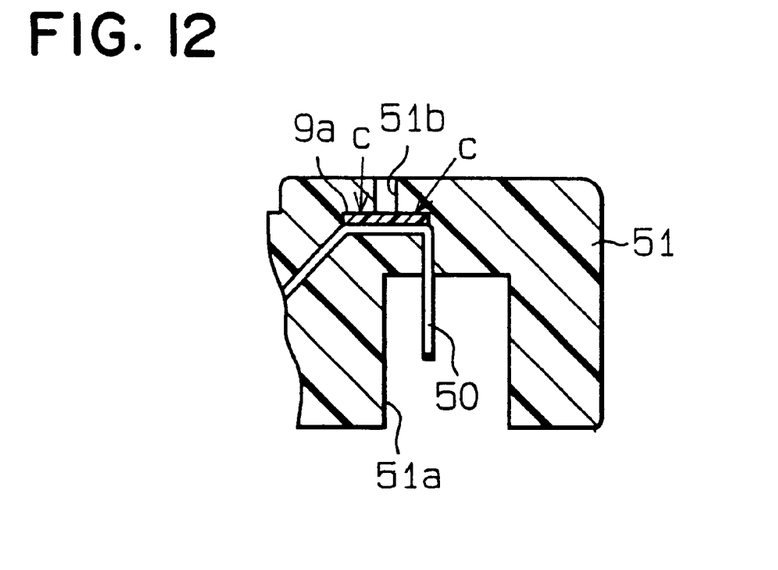
FIG. 12 is a cross-sectional view showing a connector according to a further another modification of the embodiment of the present invention.
Figure 13:
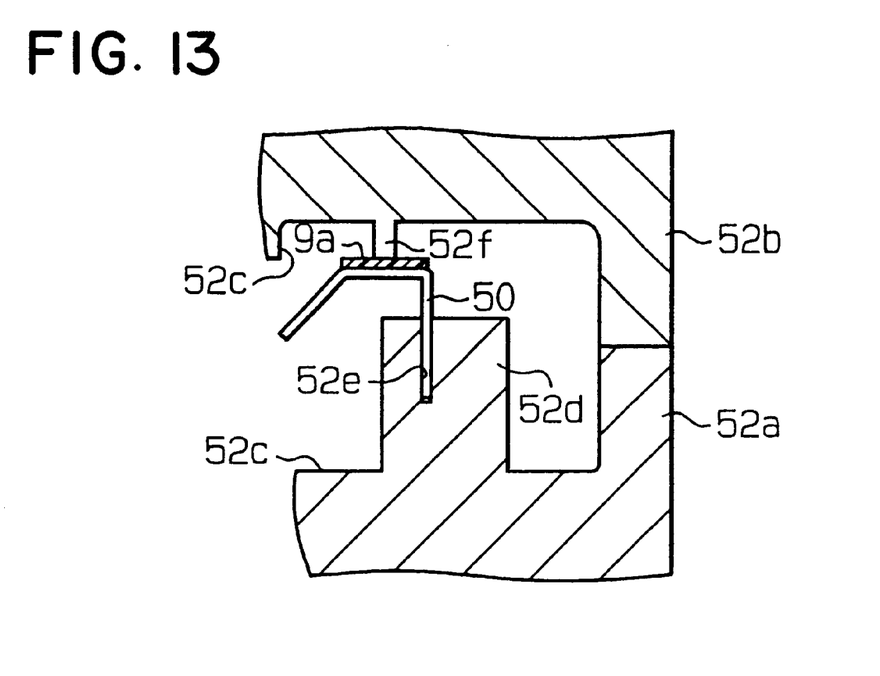
FIG. 13 is a cross-sectional view for explaining a resin molding method of the connector in FIG. 12.

Further, a connector 51 having a terminal 50 inserted in a resinous housing may be molded as shown in FIGS. 12, 13. As shown in FIG. 12, an engagement recess portion 51a engaged with a connector of a battery is formed in the connector 51, and the terminal 50 is exposed from the recess portion 51a. The housing having the connector 51 is molded from a molding resin by first and second dies 52a, 52b. A molding recess portion 52c for forming an outer shape of the connector 51 is formed in the first and second dies 52a, 52b over both of the first and second dies 52a, 52b. As shown in FIG. 13, an insertion hole 52e into which the terminal 50 is inserted is formed, and a supporting protrusion 52f contacting a sheet 9a is formed in the second die 52b. Further, the first die 52a has a molding protrusion 52d for forming the recess portion 51a. As shown in FIGS. 12, 13, the sheet 9a is directly fixed to the terminal 50, and melted molding resin is poured into the first and second dies 52a, 52b. The sheet 9a has an outer diameter larger than the supporting protrusion 52f of the second die 52b. The sheet 9a is made of resin having a melting point equal to or lower than the melting point of the molding resin for forming the connector 51. Therefore, at least at a boundary between the sheet 9a and the connector 51, the sheet 9a is melted by heat from the melted molding resin. Thus, a clearance between the sheet 9a and the connector 51 can be accurately closed. As a result, it can prevent liquid from being introduced to the terminal 50 from the hole 51b formed due to the supporting protrusion 52f of the second die 52b.

Further, in the above-described embodiment of the present invention, the first plate 7 may be formed from a resin having a melting point equal to or lower than that the molding resin for forming the housing 4. In this case, the first plate 7 may be melted at a boundary between the first plate 7 and the housing 4, so that sealing performance between the first plate 7 and the housing 4 can be improved. Thus, it can prevent liquid from being introduced to the first and second terminals 5, 6 from the hole 4d.

Further, the present invention may be applied to a motor having the connector 4b, 51.

Such changes and modifications are to be understood as being within the scope of the present invention as defined by the appended claims.

What is claimed is:

1. A motor comprising:

a motor portion;

a housing having an attachment portion for installing said motor portion, said housing being formed by molding a resin in a die;

a connector, disposed in said housing, for supplying power to said motor portion;

a terminal inserted in said housing between said motor portion and said connector; and an insulation member having a first portion contacting the die, and a second portion contacting said terminal, wherein:

said insulation member contacts the die at said first portion so that said terminal is disposed at a predetermined position in the die forming said housing;

said housing inserts said insulation member around said terminal, after melted resin is poured into the die; and said insulation member has a melting point equal to or lower than that of the resin for forming said housing.

2. The motor according to claim 1, wherein:

said insulation member has first and second portions, said first portion being a thin wall portion having a thinness thinner than said second portion; and said thin wall portion is melted by the melted resin pouring into the die.

3. The motor according to claim 1, wherein said first portion of said insulation member is in engagement portion engaging the die at a predetermined position.

4. The motor according to claim 3, wherein said insulation member has a groove around said engagement portion.

5. The motor according to claim 4, wherein said groove has a circular shape around said engagement portion.

6. The motor according to claim 4, wherein said second portion of said insulation member engages said terminal at a predetermined position.

* * * * *